(12) United States Patent
Broeksteeg

(10) Patent No.: US 7,587,674 B2
(45) Date of Patent: Sep. 8, 2009

(54) METHOD AND SYSTEM FOR MARKING ONE OR MORE PARTS OF A RECORDED DATA SEQUENCE

(75) Inventor: Gerardus Henricus Broeksteeg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/596,869

(22) PCT Filed: Jan. 5, 2005

(86) PCT No.: PCT/IB2005/050050

§ 371 (c)(1), (2), (4) Date: Jun. 28, 2006

(87) PCT Pub. No.: WO2005/069301

PCT Pub. Date: Jul. 28, 2005

(65) Prior Publication Data

US 2007/0022080 A1    Jan. 25, 2007

(30) Foreign Application Priority Data

Jan. 7, 2004    (EP)    ................... 04100026

(51) Int. Cl.
*G06F 3/00* (2006.01)

(52) U.S. Cl. .................. 715/723; 715/716; 715/724; 715/725

(58) Field of Classification Search .......... 715/716, 715/719–726, 500.1
See application file for complete search history.

(56) References Cited

U.S. PATENT DOCUMENTS

| | | | | | |
|---|---|---|---|---|---|
| 5,339,393 | A | * | 8/1994 | Duffy et al. | 715/723 |
| 5,467,288 | A | * | 11/1995 | Fasciano et al. | 715/716 |
| 5,519,828 | A | * | 5/1996 | Rayner | 715/723 |
| 5,781,188 | A | * | 7/1998 | Amiot et al. | 715/723 |

(Continued)

FOREIGN PATENT DOCUMENTS

EP    0782085 A1    7/1997

(Continued)

OTHER PUBLICATIONS

Sony Sound Forge 7.0 Manual, 2003, Sony Digital Pictures Inc., pp. 1-2, 78-81.*

(Continued)

*Primary Examiner*—William Bashore
*Assistant Examiner*—Ashraf Zahr

(57) ABSTRACT

An apparatus and method for marking one or more parts of a recorded data sequence including displaying a representation of the recorded data sequence, selecting a range of data by positioning a pointer between a range start point and a range end point, dividing the range into a first sub range and a second sub range, the first sub range comprising the data from the range start point to the pointer, the second sub range comprising the data from the pointer to the range end point, and if the pointer is in a range of unmarked data and a first function is selected, unmarking the first sub range and marking the second sub range, and if the pointer is in a range of marked data and a second function is selected, marking the first sub range and unmarking the second sub range.

20 Claims, 3 Drawing Sheets

U.S. PATENT DOCUMENTS

Figure 1:
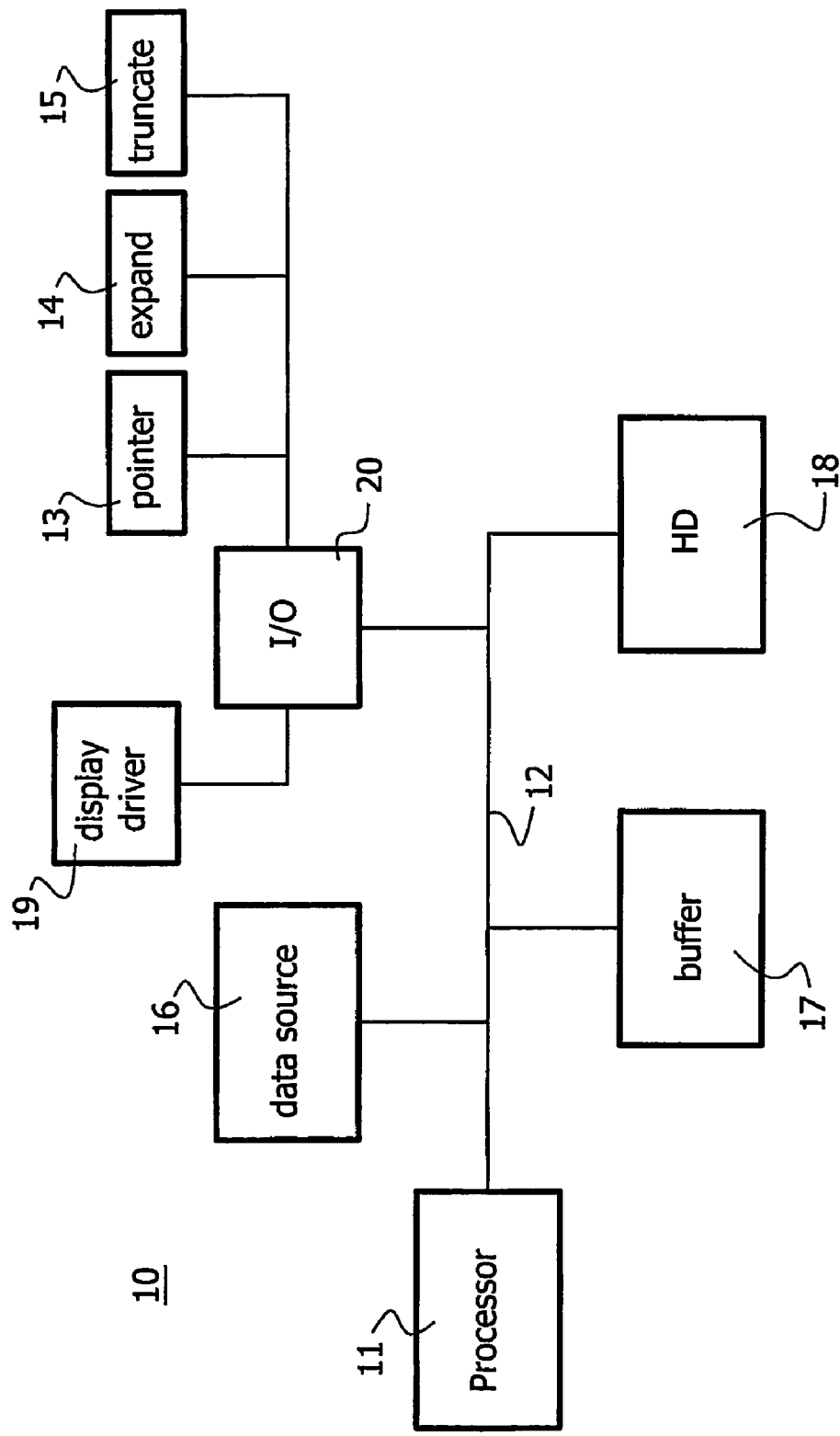

| | | | |
|---|---|---|---|
| 5,861,880 A * | 1/1999 | Shimizu et al. | 715/500.1 |
| 5,892,506 A * | 4/1999 | Hermanson | 715/500.1 |
| 5,903,264 A | 5/1999 | Moeller et al. | 715/719 |
| 5,933,145 A * | 8/1999 | Meek | 715/835 |
| 6,342,902 B1 * | 1/2002 | Harradine et al. | 715/716 |
| 6,441,830 B1 * | 8/2002 | Duvall et al. | 715/716 |
| 6,670,966 B1 * | 12/2003 | Kusanagi | 715/723 |
| 6,931,594 B1 * | 8/2005 | Jun | 715/719 |
| 6,941,508 B2 * | 9/2005 | Abbott et al. | 715/500.1 |
| 6,954,894 B1 * | 10/2005 | Balnaves et al. | 715/500.1 |
| 7,096,427 B2 * | 8/2006 | Van De Streek et al. | 715/719 |
| 7,225,405 B1 * | 5/2007 | Barrus et al. | 715/716 |
| 2003/0112261 A1 * | 6/2003 | Zhang | 345/716 |
| 2004/0001079 A1 * | 1/2004 | Zhao et al. | 345/719 |
| 2004/0221224 A1 * | 11/2004 | Blattner et al. | 715/500.1 |

FOREIGN PATENT DOCUMENTS

| | | |
|---|---|---|
| WO | WO 02/084667 A1 | 10/2002 |
| WO | WO 2084667 * | 10/2002 |

OTHER PUBLICATIONS

Introduction to Windows 95, The Basics, Online, XP002325827, http://micro.uoregon.edu/workshops/windosoutline/introwin.html., Jun. 9, 1998.

* cited by examiner

METHOD AND SYSTEM FOR MARKING ONE OR MORE PARTS OF A RECORDED DATA SEQUENCE

FIELD OF THE INVENTION

The present invention relates to a method of marking one or more parts of a recorded data sequence, such as an audio or video program, comprising displaying a representation of the recorded data sequence. Furthermore, the present invention relates to a recording device comprising a data buffer, e.g. semiconductor memory, a recording unit for storing data on a medium such as a hard disk or optical disc, and a processor connected to the data buffer and the recording unit, the processor being arranged for displaying a representation of a recorded data sequence stored in the data buffer, and for receiving user inputs from function keys.

PRIOR ART

In existing recording devices, it is possible to select passages or parts from a recorded data sequence, and to only play back the selected passages. Making the selection is done by entering a begin index pointer and an end index pointer, after which the recording device can play back the selected passage (A-B).

U.S. Pat. No. 5,903,264 describes a video delivery system and method for displaying an indexing slider bar. On a television screen, a slider bar is shown with an index marker. A user may shift the index marker over the slider bar to indicate to which position in a video stream or video program he wishes to jump. The user interface comprises buttons to alter the position of the index marker on the slider bar.

International patent application WO02/084667 discloses a method and system for selecting a position in an image sequence. A representation of an image sequence in the form of an elongate bar is indicated on a television screen, with a position indicator. Also, key frames from the image sequence are displayed in smaller format, together with indications of the position of a particular key frame in the elongate bar.

SUMMARY OF THE INVENTION

The present invention seeks to provide an improved selection method for selecting parts of an audio and/or video data recording for (semi-)permanent storage, which works more intuitively and more efficient than existing selection methods.

According to the present invention, a method according to the preamble defined above is provided, in which the method further comprises selecting a range of data by positioning a pointer between a range start point and a range end point (e.g. the beginning and end of the recorded program), dividing the range in a first sub range and a second sub range, the first sub range comprising the data from the range start point to the pointer, the second sub range comprising the data from the pointer to the range end point, and if the pointer is in a range of unmarked data and a first function (Expand) is selected, unmarking the first sub range and marking the second sub range, and if the pointer is in a range of marked data and a second function (Truncate) is selected, marking the first sub range and unmarking the second sub range. The steps of setting the pointer and performing an Expand or Truncate function may be repeated to provide multiple marked parts of the recorded sequence.

This method provides for an efficient and consistent method for marking or selecting one or more parts of a recorded data sequence. The method provides a user friendly and intuitive method for marking parts of a recorded data sequence. The initiation of the first or second function may e.g. be provided using separate actions of a user, e.g. a key labelled Expand and a key labelled Truncate. Alternatively, as the action related to the function depends on the position of the pointer, the first and second function may be provided using a single action, e.g. a key labelled Marking.

In a further embodiment, the method may further comprise inverting marked and unmarked sub ranges if the first or second function is selected a second time with the pointer at the same position as a first time. Such a toggle function is very helpful, especially in the case of a single key embodying both the first and second function. The toggle function is especially helpful for the first selection, as in that case usually the selected range is unmarked, which would allow only an execution of the first function.

In an even further embodiment the toggle method may be further expanded to multiple effects. The method then further comprises marking both sub ranges when the first or second function is selected a third time with the pointer at the same position as the first and second time. This further expands the functionality of the present method without any additional hardware required.

The recorded data sequence may be a temporarily stored data sequence, e.g. using a semiconductor memory in a recording device, and the method may further comprise storing the marked sub ranges of the temporarily stored data sequence. Using this embodiment, it is e.g. possible for a user to select the parts of a recorded data sequence without any undesired parts (e.g. commercials) and store only the selected parts. In this manner, the storage use of the recording device can be more efficient, especially in a further embodiment, in which the method comprises storing the marked sub ranges on a permanent or semi-permanent storage medium. Such a storage medium may e.g. be an optical (rewritable) disc, or a magnetic storage medium such as a hard disk.

Also, the present invention relates to a method of selecting a part of an audio or video program, comprising the steps of displaying a representation of the program, moving a pointer to a first position in the representation, executing an expand function for marking the part of the program extending from the first position to the end of the representation, moving the pointer to a second position in the marked part of the program, executing a truncate function for defining as not marked the part of the program extending from the second position to the end of the representation.

In a further aspect, the present invention relates to a recording device as defined above, in which the processor is further arranged for receiving user inputs from function keys, of which a first function key is arranged for allowing to select a range of data by positioning a pointer between a range start point and a range end point, the processor being further arranged for dividing the range in a first sub range and a second sub range, the first sub range comprising the data from the range start point to the pointer, the second sub range comprising the data from the pointer to the range end point, and, if the pointer is in a range of unmarked data and a first function input is received from the function keys, unmarking the first sub range and marking the second sub range, and if the pointer is in a range of marked data and a second function input is received from the function keys, marking the first sub range and unmarking the second sub range.

The recording device may be implemented as a hard disk recorder, in which a recorded data sequence is first recorded in a (temporary) buffer, e.g. comprising semiconductor memory units. Also, the recording device may be a combined hard disk and DVD recorder, in which a recorded data sequence on the hard disk may again be regarded as a temporary recording, for which the present invention may be applied to mark certain parts of the recording for storage on a DVD (such as a DVD+R or DVD+RW), or a Blu-Ray disc, as mentioned further below.

In a further embodiment, the processor is further arranged to invert marked and unmarked sub ranges if the first or second function is received a second time with the pointer at the same position as a first time. This toggle function can be especially helpful when using a single key to activate both the first and second function.

In an embodiment of the present recording device, the first function input is received from a dedicated expand key, and the second function input is received from a dedicated truncate key. Having two keys has the disadvantage for additional hardware, however, the processing of the method can be made more simple.

Alternatively, the first function input and the second function input are received from a single input key (Marking key). As the action associated with a key press depends on the position of the pointer being in an unmarked or marked area, this allows to implement the present invention in a very effective manner.

The recorded data sequence may be a temporarily stored data sequence, and the processor may be further arranged to store the marked sub ranges of the temporarily stored data sequence. The processor may in an even further embodiment, be further arranged to store the marked sub ranges on a permanent or semi-permanent storage medium using the recording unit.

The recording device of the present invention may be used to select one or more sub ranges or parts of a recorded data sequence using a single key press. A range of a recorded data sequence can be split in two sub ranges, of which only one is selected for recording.

SHORT DESCRIPTION OF DRAWINGS

Figure 2:
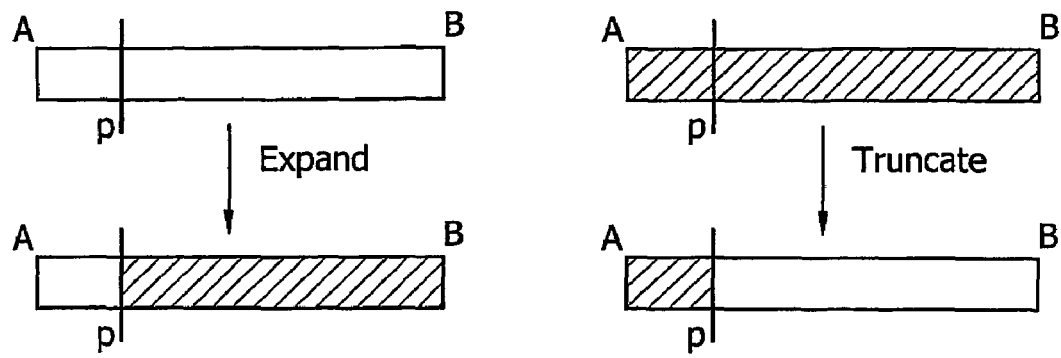
Figure 3:
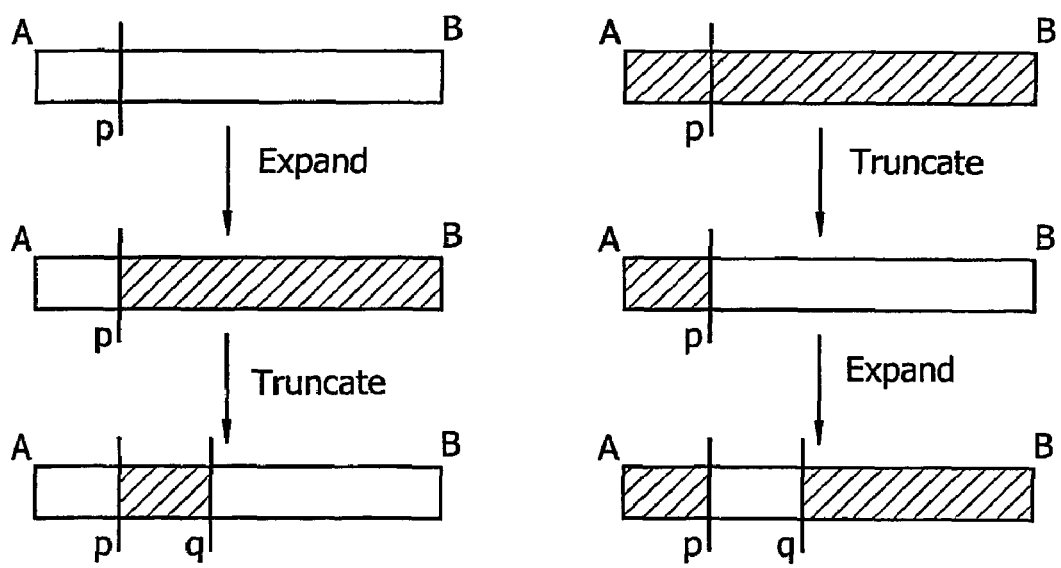
Figure 4:
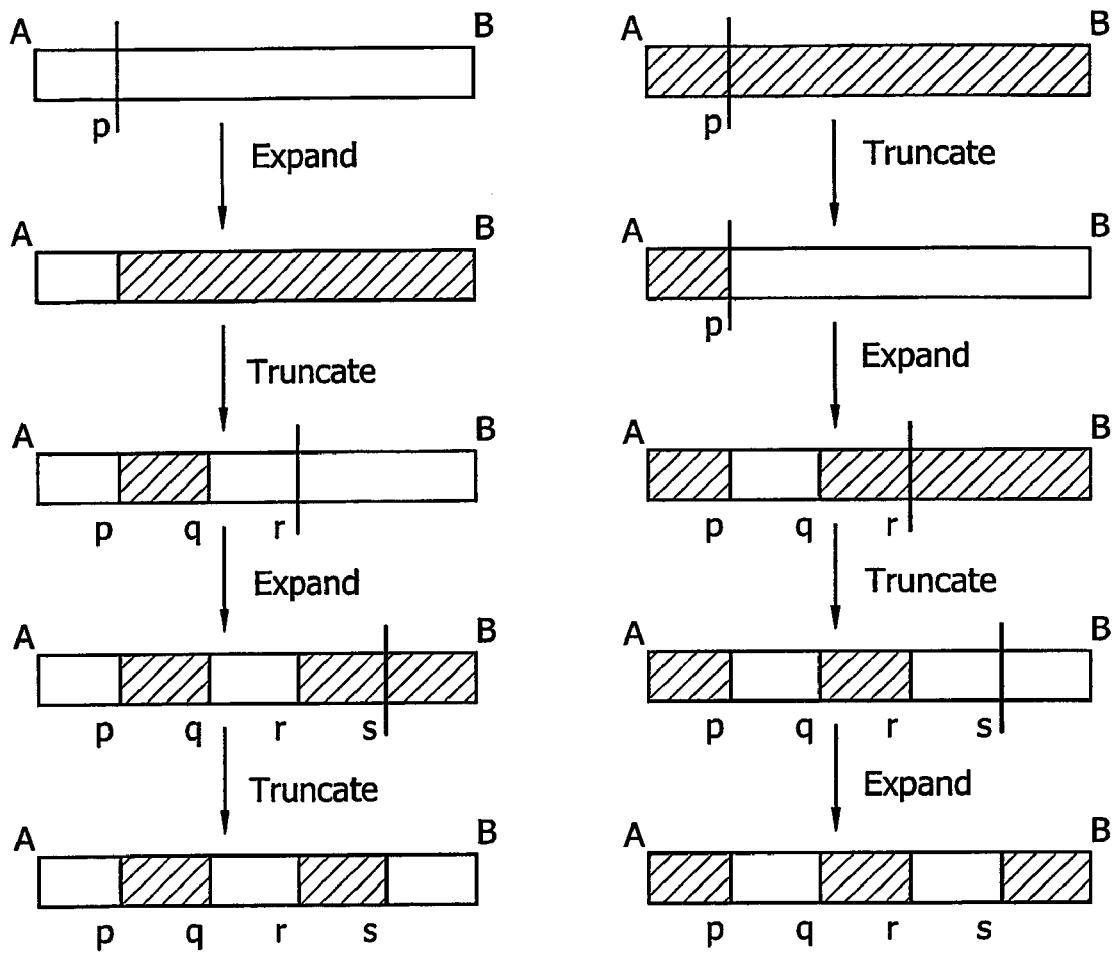

The present invention will be discussed in more detail below, using a number of exemplary embodiments, with reference to the attached drawings, in which FIG. 1 shows a schematic illustration of a recording device employing a method for selecting a part of a recorded data sequence according to an embodiment of the present invention, FIGS. 2-4 show schematic representations of a program, demonstrating the method of the present invention.

DETAILED DESCRIPTION OF EXEMPLARY EMBODIMENTS

FIG. 1 schematically shows a recording device 10 comprising an arrangement for selecting a part of a recorded data sequence according to an embodiment of the present invention.

The recording device 10 for selecting a part of a recorded data sequence comprises a microprocessor 11 and a number of other units interconnected via a system bus 12. A data source 16, such as a CATV (Cable Television) receiver which is arranged for receiving a television broadcast signal and providing a data stream or data sequence representing a TV program, is connected to the system bus 12. Also, a buffer 17 being arranged for temporary storing a television program, and a HD (Hard Disk) drive 18 are connected to the bus 12. The buffer 17 may comprise semiconductor memory, such as random access memory. Furthermore, an input/output unit (I/O) 20 is connected to the system bus 12 for providing input and output functions to the microprocessor 11. A display driver 19, being arranged for connecting a display to the recording device 10, is connected to this I/O unit 20, as well as a pointer button 13, an expand button 14, and a truncate button 15. These buttons 13-15 may be arranged as hardware buttons on the recording device 10, but may also be present on e.g. a remote control unit which is used for controlling the recording device 10.

The microprocessor 11 is arranged for processing data from the data source 16, and for storing the data in the buffer 17. After the end of the recording, the data from the buffer 17 may be stored in hard disk drive 18 for later playback. The microprocessor 11 is also arranged for retrieving a representation of a television program that is saved in the buffer 17 or in the hard disk drive 18 and providing it to the display driver 19 for displaying the representation of the television program on the display. The display may be, e.g., a computer screen or a commercially available television set.

The microprocessor 11 is further arranged for moving a pointer to a first position in the representation of the program on the display. For example, the microprocessor 11 may be arranged to move the pointer to a point of the representation of the television program that represents the beginning of the television program, by default.

The microprocessor 11 is further arranged for moving the pointer according to the inputs on the pointer button 13 in the representation of the program. For example, in an advantageous embodiment of the present invention, the pointer button 13 may be a doube action switch, e.g. in the form of a joystick, being arranged for moving the pointer from the first position in the representation of the program to the left or to the right in order to position the pointer at a point of the representation of the television program that corresponds to the beginning of a section of the program that the viewer finds interesting and that he or she wishes to record.

The microprocessor 11 is further arranged to retrieve inputs from expand button 14 and from truncate button 15.

In an advantageous embodiment of the present invention, the viewer may use the pointer button 13, expand button 14 and truncate button 15 to select parts of the television program for recording onto the hard disk 18, in accordance with the selection method of the present invention as described below. (see further below)

The above embodiment has been described in relation to a microprocessor 11. It will be understood that other types of control units which are properly arranged to execute the methods according to the present invention may be used, such as dedicated electronic circuits (analog, digital or hybrid).

Also, the above embodiment has been described in relation to storage of the selected parts of a recording on a hard disk 18. It will be understood, that other types of (semi-)permanent storage may also be used. Examples thereof include, but are not limited to, optical disc storage ((rewritable) CD, DVD, Blu-ray Disc), magnetic medium storage (hard disk, tape, . . . ), etc., or even recorders with combined types of permanent storage, e.g. a DVD-HD-recorder.

In the case of an embodiment comprising two types of (semi-) permanent storage, e.g. a recorder having both a hard disk recording unit and a DVD recording unit, the method of the present invention may also be applied to (parts of) a video program stored on the hard disk recording unit, and to store the marked or selected parts on the DVD recording unit. This provides the advantage that programs can be recorded on the hard disk recording unit (having a large storage capacity), and that only certain parts of programs (e.g. a broadcast program without commercial breaks) are selected and recorded permanently on a write once DVD (e.g. a DVD+R), thus using the permanent recording media very efficiently.

In the above embodiment, a data source 16 has been identified, which provides data, such as video and audio data of a CATV receiver, to the recording device 10. Other data sources 16 may also provide video and/or audio data (or even other data) to the recording device 10, such as a tuner, a satellite receiver, a digital terrestrial television receiver, a set-top-box, etc.

In the hard disk recorder 10, the recorded TV programs are temporarily stored in the buffer 17. A user can indicate that a program must be saved, i.e. that it has to remain on the hard disk 18 even if the buffer 17 no longer exists.

The method according to the present invention provides a consistent user interface to mark and select as many parts of the program as required with just two functions. Traditional selection is done by marking a point, moving a pointer and marking another point. The method according to the invention is an improved selection procedure in situations where the traditional selecting cannot be used or is undesirable.

An important feature of the invention is the consistent navigation in and marking of parts of a program to end up with multiple parts that will be saved for recording. Alternately performing two functions, e.g. by pressing two keys, allows marking of as many areas as required in any location as required. These functions are now explained in more detail with reference to FIGS. 2 to 4.

Say a program has begin- and end positions A and B in a temporary buffer 17 and that p, q, r and s are points in that program, where p<q<r<s. A pointer can be used to navigate in the area that represents the program. There may be two keys 14, 15 on which the two distinct functions Expand and Truncate are mapped.

In a first embodiment, the Expand function only works in unmarked areas, whereas the Truncate function only works in marked areas of the program. Expand expands the area from the pointer position until the end of the program or until the beginning of another area. Truncate truncates the marked area from the pointer position until the end of the program or until the beginning of another area.

As can be seen in FIG. 2, if the pointer is at position p (in an unmarked area) and the user presses Expand, the area or sub range p-B is marked (left). If p is in a marked area and the user presses Truncate, the area or sub range p-B is unmarked (right).

If, in the left part of FIG. 2, the user navigates to any point in the area A-p and presses Expand again, then that would just move the begin point of the marked area However as shown in FIG. 3, if the user presses Truncate while the pointer is in area p-B (at position q), the area p-q is marked and the area q-B is unmarked.

Similarly, in the right part of FIG. 2, if the user navigates to any point in the area p-B and presses Truncate again, then that would just move the end point of the marked area. However as shown in FIG. 3, if the user presses Expand while the pointer is in the area p-B (at position q), the area A-p remains intact and the area q-B now also belongs to the total marked area in A-B.

As shown in FIG. 4, alternately pressing Expand and Truncate from marked and unmarked areas results in the division of the program A-B in as many parts (sub ranges) as required. It is useful to go to the right-most area: all Expands or Truncates from any other position only result in a re-position of the points p, q, r and s. Note that the areas that are next to each other are each other's inverse. That is also what makes this method consistent.

In the embodiment described above, the Expand function and the Truncate function are mapped on two distinct keys 14, 15. Thus in that embodiment, there is an Expand key 14 and a Truncate key 15. As said above, the Expand function only works in an unmarked area and the Truncate function only in a marked area In another embodiment, the Expand function and the Truncate function are mapped on a single key, e.g. called a Marking key, which may be implemented using one of the keys 14, 15 of FIG. 1. Pressing the Marking key when the pointer is in an unmarked area results in the execution of the Expand function whereas pressing the Marking key when the pointer is in a marked area results in the execution of the Truncate function. This embodiment has the further advantage that only one key is required on the operating device, e.g. remote control, and that the user needs to operate only one key.

In an even further embodiment, also a single key is used as in the above embodiment. However, when the present method is used for the first time, it may be that the program A-B is unmarked, and the user wants to start with a truncate function, which, in the above embodiment, is not possible. This problem is solved by allowing the function of the Marking key to toggle when the pointer is at the same position. Thus, when a user sets the pointer at position p in an unmarked area of program A-B, the first time the key is pressed, the Expand function will be used, resulting in the situation on the left of the second line of FIG. 4. When leaving the pointer at the same index location, and pressing the Marking key again, the marking/unmarking of selected areas in the program A-B will be inverted, resulting in the situation on the right of the second line of FIG. 4. After that the user may proceed as before.

In an even further embodiment, the activation of the Marking key multiple times may have another effect. In an unmarked area A-B with the pointer at position p, the first press would mark sub area p-B and leave sub area A-p unmarked. The second press would invert the sub areas, i.e. mark sub area A-p and unmark sub area p-B. The third press would mark the entire area A-B.

This method according to the invention can be used in a hard disk recorder or a combi recorder with a hard disk and a DVD. However, the method can also be applied in other apparatuses where parts of a program or recording need to be selected. The typical application area is where audio and or video data are present and where these data are represented for the user on a display device. For example, the data may be represented by a bar displayed for the user on the display device whereby the position in the bar corresponds with a time position in the data selected area (e.g. p-q in FIG. 4 left), can be regarded as new data area A-B, to which method can be applied again.

The invention claimed is:

1. A method of marking one or more parts of a recorded data sequence, comprising:
    displaying a representation of the recorded data sequence that includes a beginning and an end,
    moving a pointer to a first user-selected position in an unmarked part of the representation,
    marking a continuous part of the representation extending from the first user-selected position to the end of the representation without changing the marking of any part of the representation from the beginning of the representation to the first user-selected position,
    moving the pointer to a second user-selected position in the marked part of the representation, and
    unmarking a continuous part of the representation extending from the second user-selected position to the end of the representation.

2. The method of claim 1, further comprising inverting marked and unmarked parts of the representation of the recorded data sequence if marking or unmarking is selected a second time with the pointer at the same position within the representation as a first time.

3. The method of claim 2, further comprising marking both parts of the representation of the recorded data sequence when marking or unmarking is selected a third time with the pointer at the same position within the representation as the first and second time.

4. The method of claim 3, including storing a sequence that includes only parts of the recorded data sequence corresponding to the marked parts of the representation of the recorded data sequence.

5. The method of claim 2, including storing a sequence that includes only parts of the recorded data sequence corresponding to the marked parts of the representation of the recorded data sequence.

6. The method of claim 1, including storing a sequence that includes only parts of the recorded data sequence corresponding to the marked parts of the representation of the recorded data sequence.

7. The method of claim 6, wherein the storing of the sequence is to a storage medium.

8. The method of claim 1, including:
moving a pointer to a plurality of user-selected positions in unmarked parts of the representation,
marking a plurality of continuous parts of the representation extending from each of the plurality of user-selected positions to the end of the representation,
moving the pointer to an other plurality of user-selected positions in marked parts of the representation, and
unmarking an other plurality of continous parts of the representation extending from each of the plurality of other user-selected positions to the end of the representation.

9. The method of claim 8, including storing a sequence that includes only parts of the recorded data sequence corresponding to the marked parts of the representation of the recorded data sequence.

10. A recording device comprising:
a data buffer,
a recording unit for storing data on a storage medium, and
a processor connected to the data buffer and the recording unit, the processor being configured to:
display a representation of a recorded data sequence stored in the data buffer,
receive user inputs from one or more function keys,
mark a first continuous part of the representation extending from a user-selected first position in an unmarked part of the representation to the end of the representation, and
unmark a second continuous part of the representation extending from a second user-selected position in the first part of the representation to the end of the representation.

11. The recording device of claim 10, wherein the processor is configured to invert marked and unmarked parts of the representation if two sequential user inputs are received at a same user-selected position of the pointer within the representation.

12. The recording device of claim 11, wherein the processor is configured to mark an entirety of the representation when a third sequential user input is received at the same user-selected position of the pointer within the representation.

13. The recording device of claim 12, wherein the processor is configured to enable the recording unit to store a sequence that includes only parts of the recorded data sequence corresponding to the marked parts of the representation to the storage medium.

14. The recording device of claim 11, wherein the processor is configured to enable the recording unit to store a sequence that includes only parts of the recorded data sequence corresponding to the marked parts of the representation to the storage medium.

15. The recording device of claim 10, wherein the processor is configured to enable the recording unit to store a sequence that includes only parts of the recorded data sequence corresponding to the marked parts of the representation to the storage medium.

16. The recording device of claim 10, wherein the one or more function keys include a marking key for providing the user-selected first position, and an other unmarking key for providing the user-selected second position.

17. The recording device of claim 10, wherein the one or more function keys include a single key for providing the user-selected first and second positions.

18. The recording device of claim 10, including a memory element, wherein the processor is configured to store only parts of the recorded data sequence corresponding to the marked parts of the representation to the memory element.

19. The recording device of claim 10, wherein the processor is configured to:
mark a plurality of continuous parts of the representation from each of a plurality of user-selected positions in unmarked parts of the representation to the end of the representation, and
unmark an other plurality of continous parts of the representation from each of an other plurality of user-selected positions in marked parts of the representation to the end of the representation.

20. The recording device of claim 19, wherein the processor is configured to enable the recording unit to store a sequence that includes only parts of the recorded data sequence corresponding to the marked parts of the representation to the storage medium.

* * * * *